United States Patent [19]

Lockard

[11] 3,774,015

[45] Nov. 20, 1973

[54] OPTICAL READER FOR AN EMBOSSED CARD

[75] Inventor: Joseph Larue Lockard, Harrisburg, Pa.

[73] Assignee: AMP Incorporated, Harrisburg, Pa.

[22] Filed: July 7, 1972

[21] Appl. No.: 269,629

Related U.S. Application Data

[63] Continuation-in-part of Ser. No. 144,503, May 18, 1971, Pat. No. 3,706,874.

[52] U.S. Cl........ 235/61.11 E, 250/219 D, 250/227, 350/96 B

[51] Int. Cl............................ G02b 5/14, G06k 7/10

[58] Field of Search.............. 235/61.11 R, 61.11 C, 235/61.11 E, 61.7 B; 250/227, 219 D; 350/96 B; 200/46; 340/149 A

[56] References Cited

UNITED STATES PATENTS

| | | | |
|---|---|---|---|
| 3,671,717 | 6/1972 | Bieser | 235/61.7 B |
| 3,470,358 | 9/1969 | Sallach | 235/61.11 C |
| 3,612,832 | 10/1971 | Goldstein et al. | 235/61.11 E |
| 3,611,292 | 10/1971 | Brown et al. | 235/61.11 E |

*Primary Examiner*—Thomas J. Sloyan
*Attorney*—William J. Keating et al.

[57] ABSTRACT

In a reader for serially reading an array of embossments of an embossed card, a single fixed read head is utilized. Driving wheels engage the embossed card and transport the embossments thereof serially past the read head. The read head includes a plurality of optical transmission lines which are purposely selectively shuttered by the raised embossments. Thus a light signal transmitted through the optical transmission lines is selectively shuttered to provide an intermittent optical code identifying each individual raised embossment of the serially arranged array. The read head is carried by a movable arm in the reader, the arm being automatically movable to initially align the reader with respect to the serial array of embossments, thereby providing an aligning feature which allows the read head to be automatically adjustable for alignment with variations in embossment array locations on different embossed cards. In addition, the read head is movably mounted with respect to the arm allowing automatic adjustment of the read head for alignment with an individual embossment which may be misaligned in the serial array. The read head is provided with structure which positively biases the read head into positive engagement on the inclined surfaces of each individual embossment, but which is yieldable to allow movement of the read head to engage and to conform with the irregularities in height and in inclination of each individual embossment.

15 Claims, 4 Drawing Figures

United States Patent [19]
Lockard
[11] 3,774,015
[45] Nov. 20, 1973
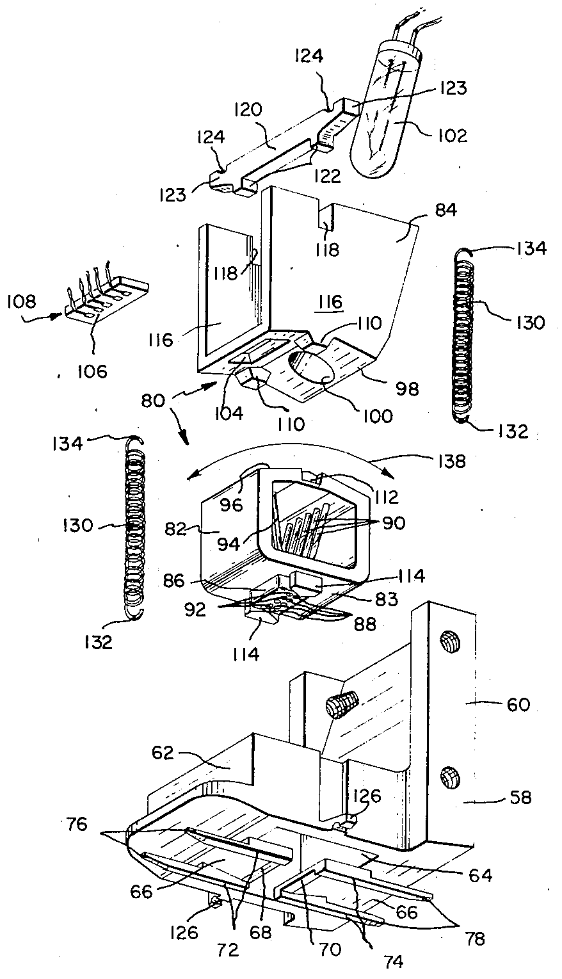

PATENTED NOV 20 1973 3,774,015

SHEET 3 OF 3

OPTICAL READER FOR AN EMBOSSED CARD

This application is a continuation-in-part of application Ser. No. 144,503, filed May 18, 1971 and now U.S. Pat. No. 3,706,874. The present invention relates generally to an optical reader for embossed cards, and to a particular read head of the optical reader. In the reader, a single fixed read head is utilized. Driving wheels engage the embossed card and transport the serial array of aligned embossments thereof serially past the read head. The read head includes a plurality of optical transmission lines which are purposely selectively shuttered by the raised embossments. Thus a light signal transmitted through the optical transmission lines is selectively shuttered to provide an intermittent optical code identifying each individual raised embossment of the serially arranged array. The read head is carried by an arm which is automatically movable to initially align the reader with respect to the serial array of embossments, thereby providing an aligning feature which allows the read head to be automatically adjustable for alignment with variations in embossment array locations on different embossed cards. In addition, the read head is movably mounted with respect to the arm allowing automatic movement of the read head for conforming engagement on an individual embossment which may be misaligned in the serial array, irregular in height or irregular in surface inclination. The read head is provided with structure which positively biases the read head into positive engagement on the inclined surfaces of each individual embossment, but which is yieldable to allow movement of the read head to engage and conform with the irregularities in height and in inclination of each individual embossment.

It is therefore an object of the present invention to provide an optical reader for embossed cards utilizing a generally fixed read head and a transport mechanism for serially transporting a serial array of the raised embossments of the card past the read head.

Another object of the present invention is to provide an optical reader for reading a serial array of raised embossments of an embossed card, the reader being provided with a variable alignment structure which initially engages the serial array of embossments of an individual embossed card and adjustably positions the read head in proper alignment for serially reading the array of embossments which are serially transported past the read head.

Another object of the present invention is to provide a card reader with a transport mechanism for serially transporting an array of serially arranged embossments individually past a generally fixed read head, the reader being provided with an alignment mechanism which initially engages the serially arranged array and positively positions the read head in proper alignment for serially reading the individual embossments which are transported serially past the read head.

Another object of the present invention is to provide a read head structure which is positively biased into engagement on the raised surfaces of a plurality of raised embossments transported serially past said read head, the read head being movably mounted in a card reader for conformity with irregularities in height and in inclination of the raised surfaces of each individual embossment.

Another object of the present invention is to provide a card reader with a read head structure having a biasing means for normally urging the read head into positive engagement on the raised surfaces of individual embossments serially transported in the reader past the read head, the biasing means being also yieldable to allow relative movement of the read head into conforming engagement with irregularities in height and in inclination of the raised surfaces of individual embossments transported serially past the read head.

Another object of the present invention is to provide an optical card reader having a read head including five optical transmission paths linearly arranged along a single line extending transversely with respect to an array of serially arranged raised embossments of an embossed card, the embossments being transported serially past said trans-versely arranged single line of optical transmission lines, the read head being positively biased and movably mounted in the reader for positive engagement and conformity with the irregularities in height and in inclination of the individual embossments of the array.

Other objects and many attendant advantages of the present invention will become apparent upon perusal of the following detailed description taken in conjunction with the accompanying drawings, wherein.

Figure 1:
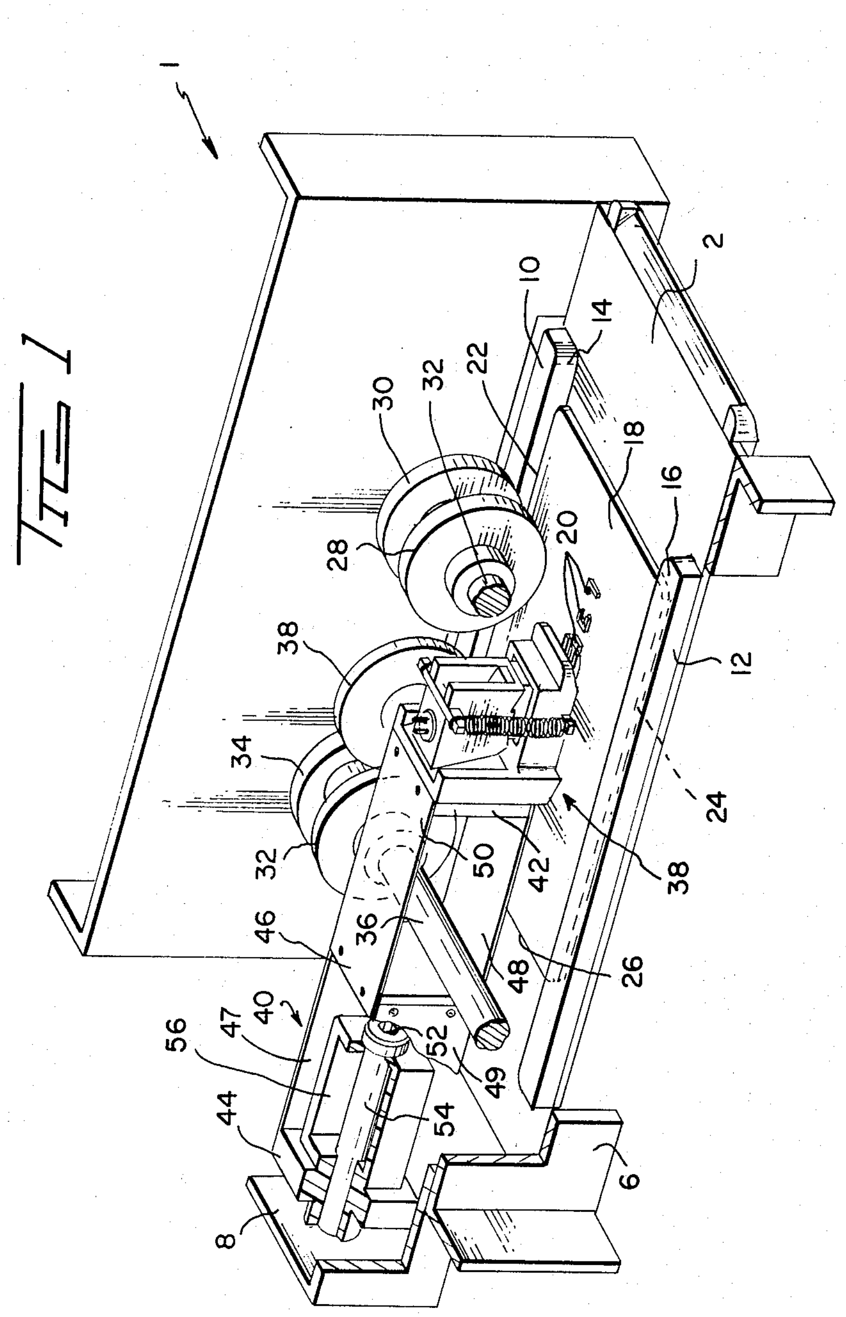
FIG. 1 is a reduced fragmentary perspective with parts broken away and with parts in section illustrating the details of a preferred embodiment of an optical card reader according to the present invention.

With more particular reference to the drawings, there is illustrated in FIG. 1 generally at 1 an optical card reader for embossed cards according to the present invention. As shown the card reader includes a generally planar table surface 2 mounted between a pair of sidewalls 4 and 6 which are joined together by an endwall 8. The sidewalls and endwall provide a frame illustrated in fragmentary configuration. It is understood that the reader also includes an attractive housing which overlies the frame but which is omitted for clarity in explanation of the present invention. The table 2 includes a pair of spaced, elongated, vertically protruding card guide rails 10 and 12. The opposed end portions 14 and 16 of the rails are rounded to facilitate insertion therebetween of an embossed card 18. Thus an operator of the reader generally locates the card 18 against and in overlying relationship on the table 2 with the raised array of serially aligned embossments 20 of the card facing away from the table surface. The card is pushed forwardly while between the rails 10 and 12, the rounded end portions 14 and 16 of the rails guiding and funneling the opposed edge margins 22 and 24 of the card for receipt of the edge margins between the rails 10 and 12. The forwardly inserted edge margin 26 of the card 18 is initially received under a pair of drive rollers 28 and 30 mounted for rotation on a rotatable shaft 32. The rollers 28 and 30 are part of a transport mechanism which further includes additional rollers 32 and 34 mounted for rotation upon a rotatable shaft 36, and another drive roller 38 mounted between the pairs of rollers 28, 30 and 32, 34. The rollers 28, 30, 32, 34 and 38 are part of an actively driven transport mechanism for transporting the embossed card 18 with relative sliding displacement generally linearly between the spaced rails 10 and 12. The rollers are positioned in spaced relationship above the table surface 2 such that they become forcibly impressed against the surface of the card 18, thereby creating sufficient friction to slidably displace the card 18 over the table surface upon rotation of the rollers. The rollers are specific to a transport mechanism of the type disclosed in U.S. Pat. application Ser. No. 205,091, filed Dec. 6, 1971 and assigned to AMP Incorporated, Harrisburg, Pennsylvania, assignee of the present invention. The particular details of such transport mechanism are purposely omitted for simplicity. It should be understood that the disclosure of such patent application is specifically incorporated by reference herein.

Yet with reference to FIG. 1, operation of the drive rollers of the transport mechanism is initiated upon receipt of the forward margin 26 of the card 18 wedgingly beneath the rollers 28 and 30. The rollers 28 and 30 are responsive to such receipt of the forward margin 26 to initiate activation of the transport mechanism for transporting the card 18 slidably over the table surface 2 and generally between the rails 10 and 12. As shown in the figure, the card 18 is provided with the array of raised embossments 20 in serial aligned relationship with respect to the forward margin 26 of the card. Upon transport of the card, the embossments 20 are serially transported beneath a read head generally illustrated at 38. The read head 38 is generally fixed or stationarily located within the card reader 1, yet is mounted for adjustable relative movement for a purpose to be described hereinafter. The read head 38 is mounted generally in slightly spaced relationship above the surface of the table 2 for serially reading each individual embossment of the array of embossments 20 serially transported past the read head. More specifically, the read head 38 is mounted on an arm generally illustrated at 40. The arm includes end mounting blocks 42 and 44 and an intermediate mounting block 46. The blocks are generally of square plate configuration and are connected together by generally rigid rectangular metal elongated plates 48 and 50, thereby forming a generally rectangular open box beam configuration comprising the arm 40. The arm 40 is mounted to the frame endwall 8 in the following manner. An elongated shaft, a portion of which is shown at 52 has its end portions rotatably mounted in the intermediate block 46 which forms a pillow block for the shaft 52. The other end of the shaft 52 is fixedly mounted in the endwall 8. A sleeve 54 is mounted for rotation over the shaft 52. The shaft 52 is fixedly mounted in an elongated, rectangular, box configuration brace 56 and also to the end block 44 of the arm 40. As shown in FIG. 1 the shaft 52 is mounted or extends along the longitudinal axis of the arm 40, the arm thereby being mounted for rotation about its longitudinal axis on the shaft 52. That part of the read head 38 which is received serially over the embossments 20 is located generally offset with respect to the longitudinal axis of the arm 40. Accordingly, any rotational movement of the arm 40 about its longitudinal axis will cause a corresponding rocking motion of the read head 38 back and forth in a direction extending laterally between the rails 10 and 12. Such action thus allows the read head to adjust itself rockably over the surface of the card 18 in order to precisely position the read head over the embossments which are serially transported therepast. More specifically, the embossments when formed in the card cause the formation of an irregular convexly bowed configuration of the card adjacent the embossments. The rocking motion of the read head conforms the read head to the irregularities of the bowed configuration to insure the read head will be impressed in engagement on the embossments serially transported therepast, without the danger of the read head being deflected off each of the embossments by the bowed configuration.

With more particular reference to FIGS. 2 and 3, the details of the read head 38 will be explained. The read head includes a generally L-shaped tray 58 with one leg portion 60 thereof being fixedly secured to the end block 42 of the arm 40 by any conventional fastening technique. The other leg portion 62 of the tray 58 is generally integrally formed with the leg portion 60 and is provided with a generally rectangular vertically extending aperture 64 therethrough. As more particularly shown in FIG. 3, the aperture 64 communicates with an undersurface 66 of the leg portion 62. The undersurface 66 also extends continuously over a pair of horizontally extending opposed shelves 68 and 70 which generally partially overlie the aperture 64. The shelf portions are respectively provided with pairs of guide rails 72 and 74. The rails 72 and 74 are mutually aligned and have tapered tips 76 and 78 for a purpose to be hereinafter explained. The read head is further provided with a carriage generally illustrated at 80. The carriage includes a holder portion 82 and a receptacle portion 84. The holder portion 82 is generally of box-like configuration and has a depending chip or wafer 86 fixedly receiving the terminal ends 88 of five signal-sending optical transmission lines 90. The transmission lines may be either fiber optic or any other desirable optical transmission line material. The wafer 86 also fixedly receives therein the terminal ends 92 of a corresponding plurality of signal-receiving optical transmission lines 94. As shown more specifically in FIG. 3, the transmission lines 90 generally diverge away from the transmission lines 94. The diverging transmission lines 90 and 94 terminate generally at an inverted V-shaped configuration 96 of the holder portion 82. The receptacle portion 84 of the carriage 80 is provided with a complementary inverted V-shaped configuration 98 adapted to be engaged against the inverted V-shaped configuration 96 of the holder portion 82. The diverging configuration of the transmission lines 90 permit the terminal ends of the transmission lines to be located and terminated generally at an enlarged cylindrical aperture 100 provided in the receptacle portion 84. The receptacle portion 100 receives a light bulb 102 therein. The diverging configuration of the signal-receiving transmission lines 94 are for the purposes of locating the terminal ends of the transmission lines 94 at an aperture generally of square configuration 104 which is purposely isolated in spaced relationship from the aperture 100. The aperture 104 receives therein a complementary shaped wafer or chip 106 having a corresponding plurality of five electro-optical transducers 108. Operation of the read head is similar to that of the read head disclosed in U.S. Pat. application Ser. No. 144,503, filed May 18, 1971. More specifically, light is transmitted from the light source bulb 102 through the five signal-sending transmission lines 90. The terminal ends 88 of the transmission lines 90 are located along a single straight line. The wafer 86 is serially impressed over the individual embossments 20 of the card 18 as the embossments are transported serially past the wafer 86. The raised surfaces of the embossments selectively shutter the terminal ends 88 of the five signal-sending transmission lines 90 to provide an optical code. Normally the light emitted from the terminal ends 88 of the transmission lines 90 is reflected off the surface of the card and is received into the corresponding terminal ends 92 of the signal-receiving optical transmission lines 94. The light emitting from the transmission lines 94 is received by the electro-optic transducers 108 which convert the received light energy into a corresponding output electrical signal. As the embossments provide a shuttered optical code, the optical code is transmitted through the signal-receiving transmission lines 94 to provide a corresponding intermittent encoded electrical output from the transducers 108. The intermittent signals are received by a suitable decoder (not shown) available in the prior art. Thus the intermittent electrical code is indicative of the individual embossment which selectively shutters the terminal ends 88 of the transmission lines 90 to produce the code.

In the assembly of the read head 38, the receptacle portion 84 is stacked in overlying relationship to the holder portion 82, with the inverted V-shaped portions 98 and 96 in complementary engaging relationship. The receptacle portion 84 is provided with a pair of spaced bosses 110 which are received in complementary notch portions 112 of the holder portion 82. The engaged inverted V-shaped configurations specifically align the light source and the transducer 106 with the corresponding signal-sending transmission lines 90 and the signal-receiving transmission lines 94 respectively. The wafer 86 is generally rectangular and protruding from the bottom surface 83 of the holder portion 82. The wafer is located between a pair of spaced protruding guide blocks 114. The guide blocks and the rectangular wafer 86 are freely received in the complementary rectangular space defined between the shelf portions 70 and 72 of the holder 58.

Figure 2:
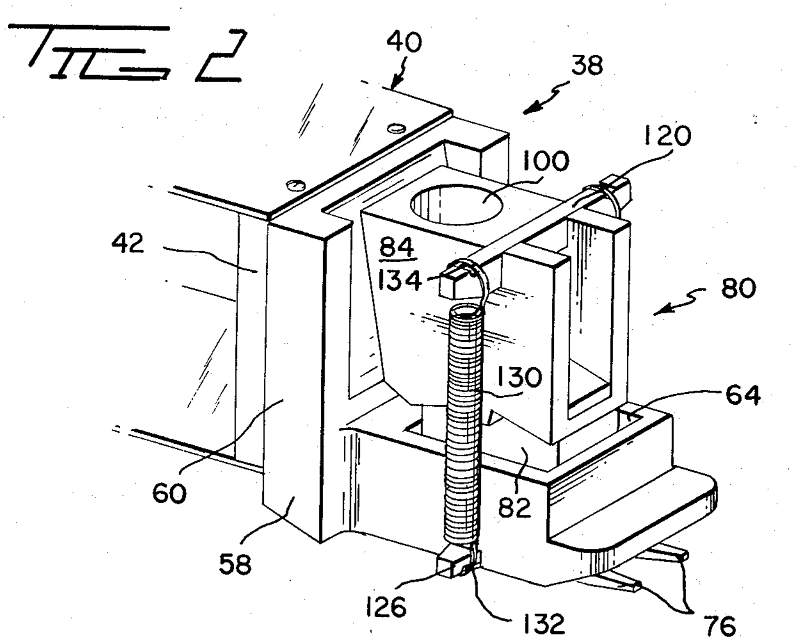
FIG. 2 is an enlarged fragmentary perspective of a preferred embodiment of a read head according to the present invention forming a part of the preferred embodiment illustrated in FIG. 1.
Figure 4:
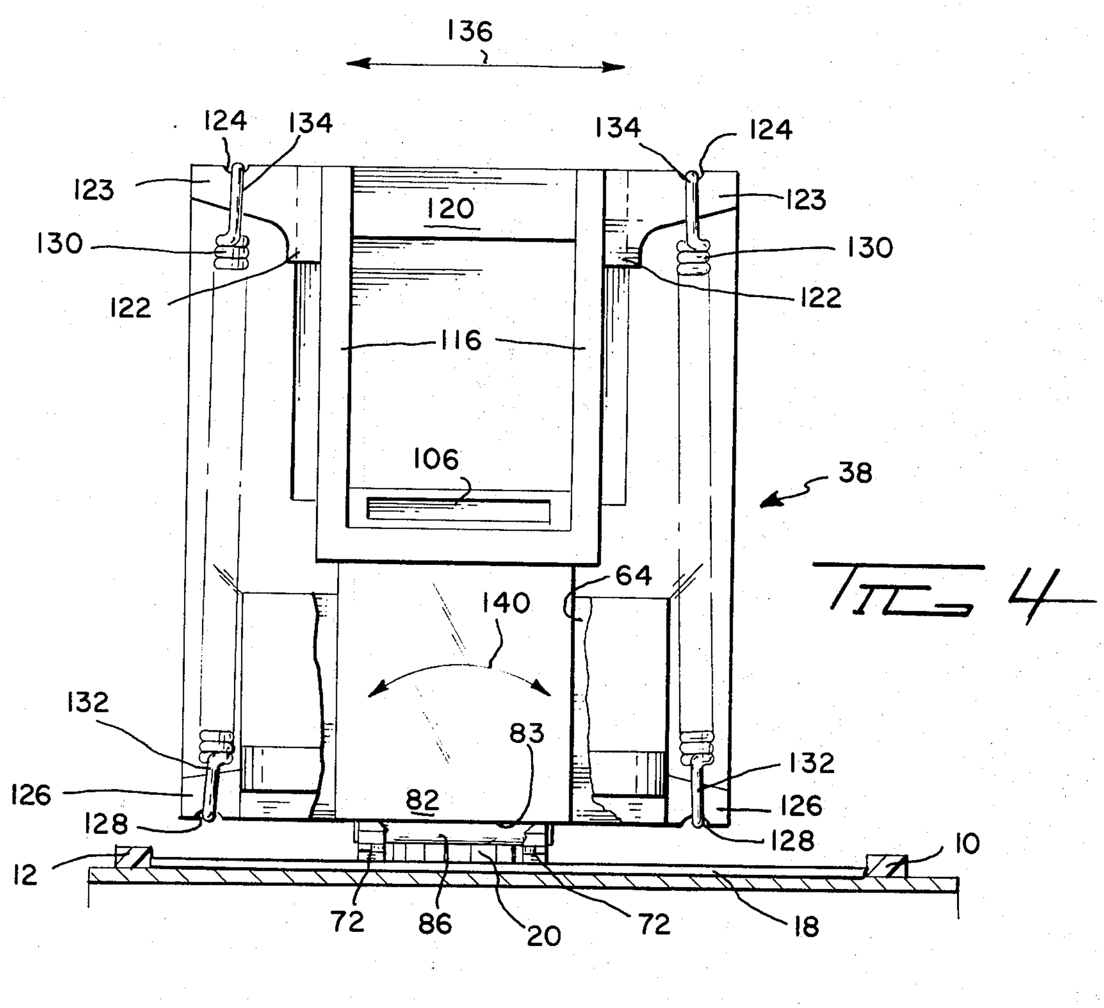
FIG. 4 is an enlarged fragmentary elevation illustrating the read head of FIG. 2 in positive engagement with an individual raised embossment of an embossed card.
Figure 3:
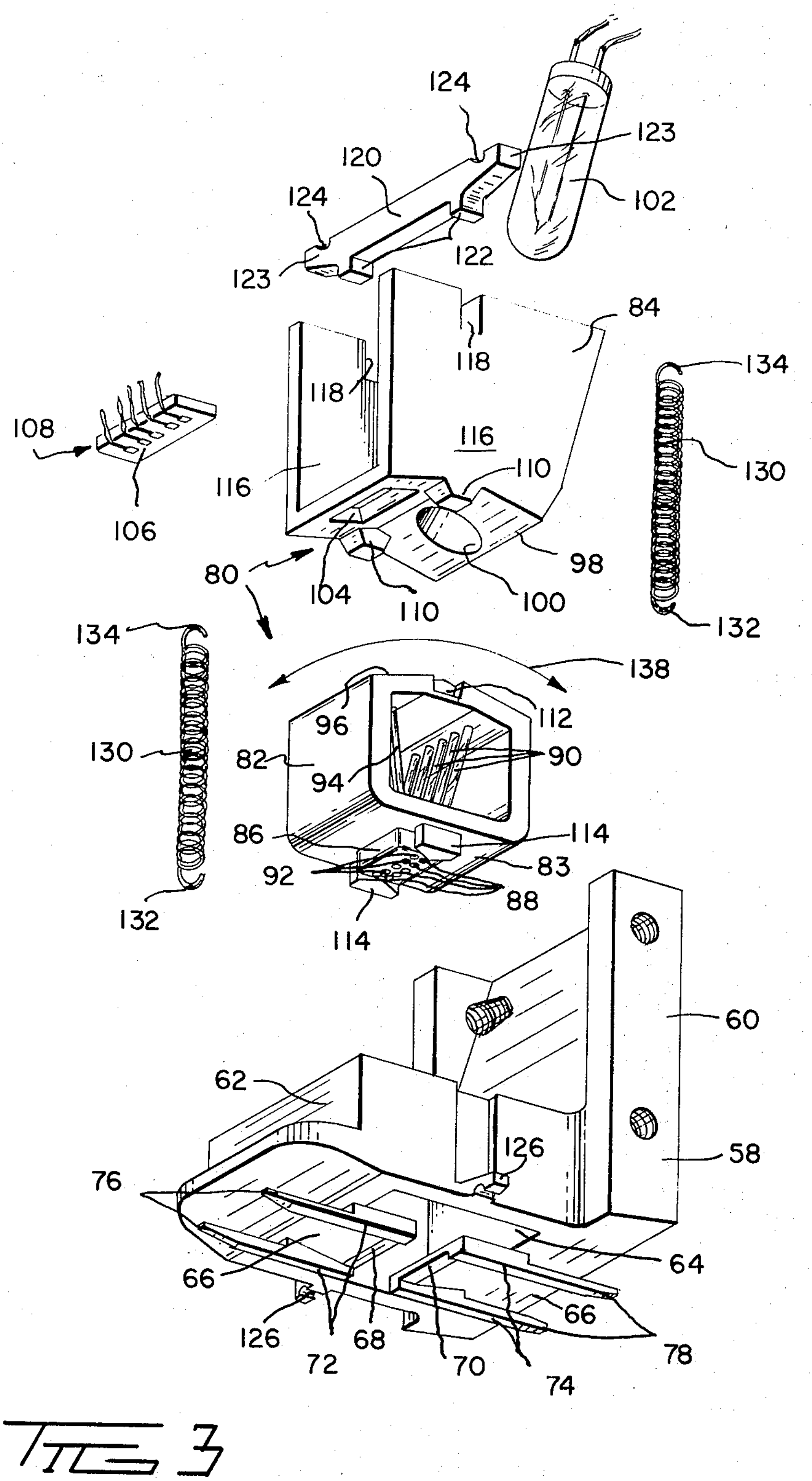
FIG. 3 is an enlarged perspective of the preferred embodiment illustrated in FIG. 2 with parts in exploded configuration illustrating the details thereof.

With reference yet to FIGS. 2, 3 and 4, the receptacle portion 84 includes a pair of spaced sidewalls 116 having notch portions 118 therein. An elongated yoke 120 extends transversely across the receptacle portion and is received internally of the notch portions 118. The yoke 120 includes a pair of spaced inverted protruding bosses 122 receiving therebetween the sidewalls 116 of the receptacle portion 84, thereby fixedly locating the yoke in position thereon. The end portions 123 of the yoke 120 are partially notches as shown at 124. The end portions 123 extend laterally outward from the carriage portion and generally are in spaced alignment with a pair of laterally protruding flange portions 126 provided on the leg portion 62 of the tray 58 adjacent to the bearing surface 66. The flange portions 126 are individually provided with an inverted notch portion 128. A pair of elongated coil springs 130 bridge between the yoke 120 and a corresponding flange portion 126. More specifically, each coil spring 130 includes a hooked end portion 132 received in a corresponding notch portion 128 of the flange portion 126. The other hooked end portion 134 of each coil spring 130 is received in a corresponding notch portion 124 of a yoke end portion 123. With the component parts of the read head in assembled configuration as shown in FIGS. 2 and 4, the coil springs 130 are placed in tension, thereby biasing the receptacle portion 84 and the holder portion 82 into vertically stacked relationship into the aperture 64 provided in the tray portion 58. Such biasing action also continuously biases the wafer 86 and the end blocks 114 to protrude from the space defined between the shelf portions 68 and 70 and thereby protrude beyond the bearing surfaces 66 of the shelf portions. To prevent the holder portion 82 from falling entirely through the aperture 64, the shelf portions 68 and 70 will engage against the bottom surface 83 of the holder portion 82.

In operation, reference will be made to FIG. 4 of the drawings. When the embossed card 18 is transported between the rails 10 and 12 by the transport mechanism as described, the array of embossments 20 thereof will be serially transported between the guide rails 72 of the tray 58. The exact location of the array of embossments 20 may vary somewhat from card to card. Thus, the guide rails 72 forcibly engage the first one of the embossments and laterally shifts the read head generally in the direction of the arrow 136, thereby forcibly aligning or positioning the aperture 64 and the read head 38 automatically for correct reception serially over the aligned array of embossments 20. Such lateral shift in the read head is automatically accomplished by provision of the guide rails 72 which intercept therebetween the first one of the plurality of embossments. The desired lateral shifting or adjustment of the read head is accomplished automatically since the arm 40 on which the read head is mounted is free to deflect and to rotate about the shaft 52 in response to the rails 72 aligning themselves for reception therebetween of the embossments. Thus the rails 72 effectively steer the read head into proper adjustment. The tapered tips 76 guide and funnel the embossments into position between the rails.

As each individual embossment 20 is transported past the read head, the raised surface configuration of the embossment will forcibly engage against the wafer 86 which protrudes from the bottom surface 63 of the tray 58. Such action will partially lift the carrier or holder portion 82 and the receptacle portion 84 against the action of gravity and also against the preloaded, resilient action of the pair of springs 130. Thus, contact between the wafer 86 and the surfaces of each individual embossment is assured by the inertia action of the holder portion 82 and the receptacle portion 84, as well as the resilient action of the springs 130. The fact that the reader 38 is partially raised during engagement with an embossment provides substantial advantages. For one advantage, the individual embossments 20 will vary in height. The lifting action as each embossment engages against the wafer 86 will automatically force the reader to automatically adjust itself for engaging individual embossments of different heights. Since the embossments 20 engage the wafer 86 and thereby lift the holder portion 82, the bottom surface 83 of the holder portion is lifted from engagement on the shelf portions 68 and 70. This provides a floating action of the holder 82 within the recess or aperture 64 of the tray 58 which permits the automatic adjustment.

With the holder 82 floatably mounted within the recess, the holder 82 is also free to rock back and forth generally in the direction of the arrow 138 shown in FIG. 3, and generally in a direction toward and away from the leg portion 60 of the tray 58 in order to adapt the wafer 86 in complementary engaged relationship over any variations or irregularities in the surfaces or the inclination of each individual embossment 20. As a further advantage, the pair of springs 130 are independently variable in length, and thus are together differentially yieldable, to permit rocking of the floatably mounted holder portion 82 generally in the direction of the arrow 140 in FIG. 4 in order to adapt the wafer 86 in conforming engagement with variations or irregularities in the surfaces or the inclination of each individual embossment 20.

Such rocking action in the direction of the arrow 140 also is an advantage when the read head 38 is substantially shifted laterally in the direction of the arrow 136. More specifically, the entire array of embossments will vary in location from card to card. In addition, each individual embossment of an array will also vary in alignment one from the other. As the individual embossments are intercepted by the guide rails 72, the read head 38 will automatically be adjusted so as to shift laterally in the direction of the arrow 136. More specifically, this is accomplished by making the plates 46 and 48 resiliently deflectable leaf springs of the same length, allowing deflection of the arm 40 in pantograph fashion. In addition, the arm includes a pair of plates 47 and 49 of resiliently deflectable spring material, of the same length to allow pantograph fashion deflection of the arm 40 in a direction perpendicular to that of the deflection of springs 46 and 48. The arm is therefore resiliently deflectable in cantilever fashion in either of two directions to permit interception of the embossments without binding in the guide rails and to permit adjustment in alignment of the read head. However, since the read head is mounted to the arm 40 which rotates about the shaft 52, the lateral shift 136 is not always linear but sometimes is a slightly arcuate displacement. Such arcuate displacement would normally tilt the wafer with respect to the embossment surface. Thus, the springs 130 must yield differentially to allow a slight rocking action of the holder portion 82 generally in the direction of the arrow 140 in order to insure conforming engagement of the wafer 86 with an individual embossment and thereby compensate for the sometimes arcuate displacement of the read head when shifted laterally in the direction of the arrow 136.

Although preferred embodiments of the present invention have been described and illustrated in detail, other modifications and embodiments of the present invention are intended to be covered by the scope and spirit of the appended claim, wherein:

What is claimed is:

1. A read head for optical reading of raised embossments provided serially on an embossed card, the surface of each of said embossments possessing irregularities in height, and surface inclination, the combination comprising:

a tray, an aperture provided in said tray, a plurality of signal-sending optical transmission lines mounted on said tray having the terminal ends thereof protruding into said aperture, a light source carried on said tray for directing light energy along said signal-sending optical transmission lines, a plurality of signal-receiving optical transmission lines having terminal ends protruding into said aperture, holding means mounted on said tray fixedly receiving the terminal ends of both said signal-sending and said signal-receiving optical transmission lines, biasing means connected to said tray and to said signal-sending and said signal-receiving optical transmission lines for biasing said terminal ends of both said signal-sending and signal-receiving optical transmission lines toward protruding relationship into said aperture, and guide means on said tray for alignment of said aperture provided in said tray over each of said raised embossments in turn as the raised embossments are serially transported past said tray, said biasing means biasing said signal-sending optical transmission lines into engagement on said raised embossments serially transported past said tray, said raised embossments engaging the terminal ends of said signal-sending optical transmission lines and selectively shuttering the terminal ends of said signal-sending optical transmission lines to create an optical code indicative of the identity of the raised embossments serially transported past said tray.

2. The structure as recited in claim 1, and further including: said receptacle portion overlying said holding means, a light source and an electro-optic both being received in said receptacle portion, alignment means cooperating with said holding means and said receptacle portion for aligning said light source with respect to said signal-sending optical transmission paths and for aligning said transducer with said signal-receiving transmission paths such that light energy from said light source is transmitted through said signal-sending optical transmission paths, reflected off the surface of said embossed card and is received through said signal-receiving optical transmission paths and is converted into electrical signals by said transducer, said embossments selectively shuttering the optical signal transferred from said signal-sending optical transmission paths to said signal-receiving optical transmission paths to create said coded optical signal.

3. The structure as recited in claim 2, wherein, said alignment means comprises a generally V-shaped surface on said receptacle portion, and further including a corresponding V-shaped portion on said holding means matingly engaged in said V-shaped surface of said receptacle portion.

4. The structure as recited in claim 1, and further including: biasing means for biasing said holding means into protruding relationship with respect to said aperture provided in said tray, said raised embossments individually engaging the holding means and displacing said holding means against the biasing action of said biasing means to allow engaging conformity of said holding means with the irregularities in each individual embossment serially transported past said read head.

5. The structure as recited in claim 4, wherein said biasing means includes a differentially yieldable portion connecting said optical transmission paths to said tray, said optical transmission paths being displaceable by each embossment surface against said biasing means, said biasing means being differentially yieldable in response to said displacement of said optical lines for conformity with the irregularities in each individual embossment serially transported past said read head.

6. The structure as recited in claim 5, wherein: said differentially yieldable portion includes at least a pair of resiliently yieldable coil springs connecting said tray and said holding means, each one of said resiliently yieldable coil springs being yieldable independently of the other in response to displacement of said holding means to allow said differential yielding of said differentially yieldable portion.

7. The structure as recited in claim 1, wherein, said signal-sending optical transmission lines comprise five in number arranged along a single line extending transversely with respect to the embossments as they are transported past said read head.

8. In an embossed card reader, the combination comprising:

a frame, a carriage provided with a plurality of signal-sending optical transmission lines and a plurality of signal-receiving optical transmission lines, a tray, mounting means mounting said tray to said frame, said carriage being mounted on said tray, transporting means on said frame for transporting a card provided with a serial array of raised embossments past said tray, steering rails on said tray for serially engaging opposed sides of a serial array of raised embossments serially transported between said steering rails and for guiding said carriage in overlying relationship serially over said embossments as they are transported past said tray, the terminal ends of said signal-sending transmission lines protruding from said carriage and through said tray between said rails for overlying and engaging individual embossments as they are transported serially past said tray, biasing means on said carriage for biasing said terminal ends of said signal-sending transmission lines toward protruding relationship from said tray at a location generally between said steering rails, said carriage being movably mounted on said tray for allowing said biasing means to bias said carriage into engagement over the irregularly inclined raised surfaces of said embossments, said carriage being movably biased by said biasing means into conforming engagement with the irregularities in the inclined raised surfaces of said embossments, and a light source on said carriage for supplying light energy along said signal-sending optical transmission lines, said light energy being selectively shuttered adjacent the terminal ends of said signal-sending optical transmission lines by said raised surfaces of said embossments to produce an intermitent optical code reflected off said card and received by said signal-receiving optical transmission lines, which code identifies each of said embossments.

9. The structure as recited in claim 8, wherein, said biasing means is differentially yieldable in response to movement of said carriage in conforming engagement with and engagement over the irregularly inclined surfaces of said embossments, and said carriage is movable against the biasing action of said biasing means during engagement over and in conforming engagement with the irregularly inclined surfaces of said embossments which are serially transported past said tray.

10. The structure as recited in claim 8, wherein, said biasing means includes at least a pair of resiliently yieldable coil springs connecting said tray and said carriage, each one of said resiliently yieldable coil springs being yieldable independently in response to said displacement of said carriage to allow said differential yielding of said biasing means in response to said movement of said carriage.

11. The structure as recited in claim 8, wherein said mounting means includes a shaft mounted on said frame, an arm mounted rotatably on said shaft, said tray being mounted on said arm and being rotatable therewith for lateral shifting of said tray into alignment over the serial array of embossments.

12. The structure as recited in claim 11, wherein, said arm comprises a first pair of resilient cantilever springs deflectable in a first direction and a second pair of resilient cantilever springs deflectable in a second direction, whereby said arm is resiliently deflectable in either of two directions to permit interception of the individual embossments without binding thereof in the guide rails and to permit adjustment in alignment of the tray over each embossment of the serial array of embossments, and further including:

resiliently yieldable means mounting said carriage to said tray and being yieldable in response to engagement of said carriage on each embossment to permit lifting of said carriage relative to said tray and thereby allow said carriage to lift and thereby adjust itself for engagement on individual embossments of different heights as the embossments are serially transported past said carriage, said resiliently yieldable means further being yieldable to permit a rocking action of said carriage with respect to said arm to ensure conforming engagement of said carriage with each embossment and thereby compensate for the lateral shifting of said tray for alignment over the serial array of embossments.

13. The structure as recited in claim 11, wherein, said arm comprises a first pair of resilient cantilever springs deflectable in a first direction and a second pair of resilient cantilever springs deflectable in a second direction, whereby said arm is resiliently deflectable in either of two directions to permit interception of the emobssments without binding in the guide rail and to permit adjustment in alignment of the tray over each embossment of the serial array of embossments, and further including:

resiliently yieldable means mounting said carriage to said tray and being yieldable in response to engagement of said carriage on each embossment to permit rocking of said carriage with respect to said tray for conforming engagement of said carriage with the inclinations in the surfaces of each said embossments in turn as said array of embossments are serially transported in turn past said tray.

14. In a card reader, the combination comprising:

a frame, a card guide on said frame for receiving an embossed card, driving means for transporting said card along said card guide and for transporting the embossments of said cards serially along said card guide, a read head for serially reading the individual embossments as they are transported serially along said card guide, an arm rotatably mounted to said frame and rotatably mounting said read head with respect to said frame, mounting means for connecting said read head for relative motion with respect to said arm, said arm being rotatably mounted with respect to said frame for initially aligning said read head over each one in turn of the serially arranged embossments of said card, said mounting means allowing relative motion of said read head with respect to said arm for allowing alignment of said read head with respect to each individual embossment in turn as said plurality of serially arranged embossments are transported in turn past said read head, means on said read head engageable against each individual embossment serially transported past said read head for positively urging and moving said read head with respect to said arm thereby ensuring positive alignment of said read head with respect to each individual embossment, and encoding means carried by said read head for producing a code identifying each embossment serially transported past said read head.

15. The structure as recited in claim 14, and further including: biasing means for biasing said read head into overlying engagement on each individual embossment serially transported past said read head, said biasing means being yieldable in response to movement of said read into engagement over each embossment head to allow conformity of said read head with irregular inclinations in the height of each individual embossment serially transported past said read head.

* * * * *

PO-1050
(5/69)

UNITED STATES PATENT OFFICE
CERTIFICATE OF CORRECTION

Patent No. 3,774,015 Dated November 20, 1973

Inventor(s) JOSEPH LARUE LOCKARD

It is certified that error appears in the above-identified patent and that said Letters Patent are hereby corrected as shown below:

Column 8, claim 2, line 28 delete the word "a" and insert ---said---.

Column 8, claim 2, line 28 after "electro-optic" insert ---transducer---.

Column 12, claim 15, line 14 after "read" insert ---head---.

Column 12, claim 15, line 14 after "embossment" delete the word ---head---.

Signed and sealed this 2nd day of April 1974.

(SEAL)
Attest:

EDWARD M.FLETCHER,JR.
Attesting Officer

C. MARSHALL DANN
Commissioner of Patents